(12) United States Patent
Mack

(10) Patent No.: US 8,919,786 B2
(45) Date of Patent: Dec. 30, 2014

(54) CHUCK

(75) Inventor: Hans-Dieter Mack, Sonthelm (DE)

(73) Assignee: Roehm GmbH, Sontheim (DE)

( * ) Notice: Subject to any disclaimer, the term of this patent is extended or adjusted under 35 U.S.C. 154(b) by 0 days.

(21) Appl. No.: 12/936,554

(22) PCT Filed: Apr. 16, 2010

(86) PCT No.: PCT/DE2010/075037
§ 371 (c)(1),
(2), (4) Date: Nov. 3, 2010

(87) PCT Pub. No.: WO2010/121613
PCT Pub. Date: Oct. 28, 2010

(65) Prior Publication Data
US 2012/0025475 A1   Feb. 2, 2012

(30) Foreign Application Priority Data
Apr. 20, 2009 (DE) .................. 10 2009 003 802

(51) Int. Cl.
*B23B 31/20* (2006.01)
*B23B 31/02* (2006.01)

(52) U.S. Cl.
CPC ............ *B23B 31/201* (2013.01); *B23B 31/028* (2013.01); *B23B 2250/12* (2013.01)
USPC ................................ 279/53; 279/51; 279/157

(58) Field of Classification Search
USPC ............................ 279/53, 51, 157, 43.4, 43.3
See application file for complete search history.

(56) References Cited

U.S. PATENT DOCUMENTS

| 3,030,119 | A | * | 4/1962 | Myers | 279/4.08 |
| 3,195,909 | A | * | 7/1965 | Winnen | 279/51 |
| 4,938,490 | A |   | 7/1990 | Bosek |  |
| 5,984,595 | A | * | 11/1999 | Mizoguchi | 408/57 |
| 6,270,086 | B1 | * | 8/2001 | Lloyd | 279/51 |
| 6,572,119 | B2 |   | 6/2003 | Selb |  |

FOREIGN PATENT DOCUMENTS

| JP | 8141878 A | 6/1996 |
| WO | 0134332 A1 | 5/2001 |

* cited by examiner

*Primary Examiner* — Eric A Gates
*Assistant Examiner* — Chwen-Wei Su
(74) *Attorney, Agent, or Firm* — Andrew Wilford

(57) ABSTRACT

The invention relates to a chuck with a chuck body (2) having a centering hole (3) that is tapered frustoconically and in which is provided a clamping member (4) having a clamping thread (5), with an angle drive (8) having a threaded ring (6) engaged with the clamping thread (5), axially fixed to the chuck body (2), coaxial to the clamping member (4), and rotatable by a drive member (9) that can be rotated about a drive axis that is not parallel to the chuck axis. The drive member (9) can be inserted from the end opposite to the centering hole (3) into a body cavity (10) that can be closed by a plate (11) that is supported on the chuck body (2) and/or the threaded ring (6). The drive member (9) is accessible for a drive tool through an aperture (12) in the cavity wall (13).

20 Claims, 6 Drawing Sheets

CHUCK

CROSS REFERENCE TO RELATED APPLICATIONS

This application is the US-national stage of PCT application PCT/DE2010/075037, filed 16 Apr. 2010 and claiming the priority of German patent application 102009003802.7 itself filed 20 Apr. 2009.

FIELD OF THE INVENTION

The invention relates to chuck with a chuck body having a centering hole that is tapered frustoconically and in which is provided a clamping member having a clamping thread, with an angle drive having a threaded ring engaged with the clamping thread, axially fixed to the chuck body, coaxial to the clamping member, and rotatable by a drive member that can be rotated about a drive axis that is not parallel to the chuck axis.

BACKGROUND OF THE INVENTION

Such a chuck is known, for example from DE 100 56 729 [U.S. Pat. No. 6,572,119], in which the angle drive is formed by a worm drive with a worm gear that is inserted into a bore of the chuck body, the bore being formed laterally in the chuck body and tangentially to the threaded ring.

OBJECT OF THE INVENTION

The object of the invention is to provide a chuck of the above-described type in such a manner that a chuck is provided that has a structure as simple as possible and a short design.

SUMMARY OF THE INVENTION

This object is solved according to the invention in that the drive member can be inserted from the end opposite to the centering hole into a body cavity that can be closed by a plate supported on the chuck body and/or the threaded ring, and that the drive member is accessible to a drive tool through an aperture in the cavity wall.

This configuration has the advantage that the drive member is completely accommodated in the chuck body in the body cavity. This is associated with a better mounting and a better protection because, in particular, the drive member has to be accessible only through one aperture that is adapted to the diameter of the drive tool and does not have to serve as the aperture through which the drive member is installed into the chuck body.

It is advantageous here if the angle drive is formed by a worm drive with a worm gear as drive member. However, there is also the possibility that the angle drive has a bevel gear as drive member, where the use of an angle drive provides different possibilities for forming the aperture in the cavity wall, namely, on the one hand, directed at an acute angle forward so that the shoulder face of an adequate body collar can be utilized. Furthermore, there is, of course, the possibility or orienting the aperture radially.

The plate serves to securely retain the drive member in the body cavity so that, after installation of the drive member in the body cavity, the plate is connected to the chuck body, it being advantageous if the plate is detachably secured on the chuck body to ensure accessibility to the drive member at a later time.

Furthermore, a stop screw can be provided in a tapped bore of the plate to form a depth stop for the tool to be inserted in the centering hole.

It is particularly preferred in the context of the invention if the plate is formed by the front end of a drive spindle because this way a compact design with few components can be used. Advantageously, a passage is formed in the drive spindle that can be used to blast air through the drive spindle into the chuck body and thereby remove chips from the work area when the chuck is used for machining. When using an embodiment with a stop screw mounted in the plate, the stop screw advantageously has a bore that communicates with the passage.

Since it is not necessary that the chuck be permanently connected to the drive spindle, it is useful if the plate then is connected to the chuck body by a retaining ring because the chuck can be preassembled in this manner.

For better support and mounting of the drive member in the chuck, an undercut forming an inner radius is machined in the cavity, for example, with a ball miller.

BRIEF DESCRIPTION OF THE DRAWING

The invention is described in more detail below with reference to embodiments shown in the drawing, in which.

DETAILED DESCRIPTION OF THE INVENTION

Figure 1:
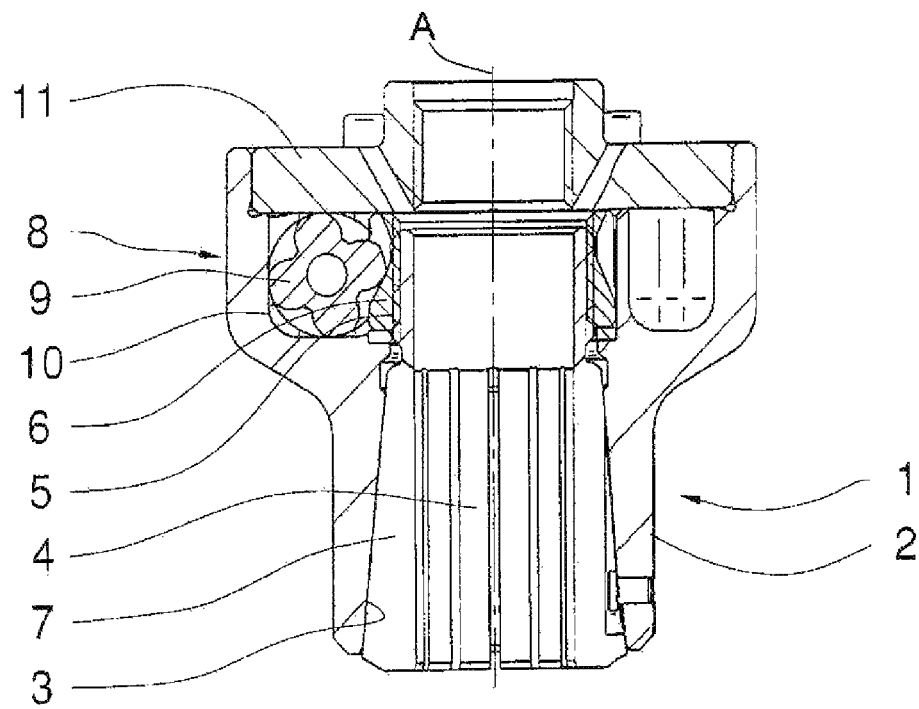
FIG. 1 is a longitudinal section through a drill chuck according to the invention.
Figure 2:
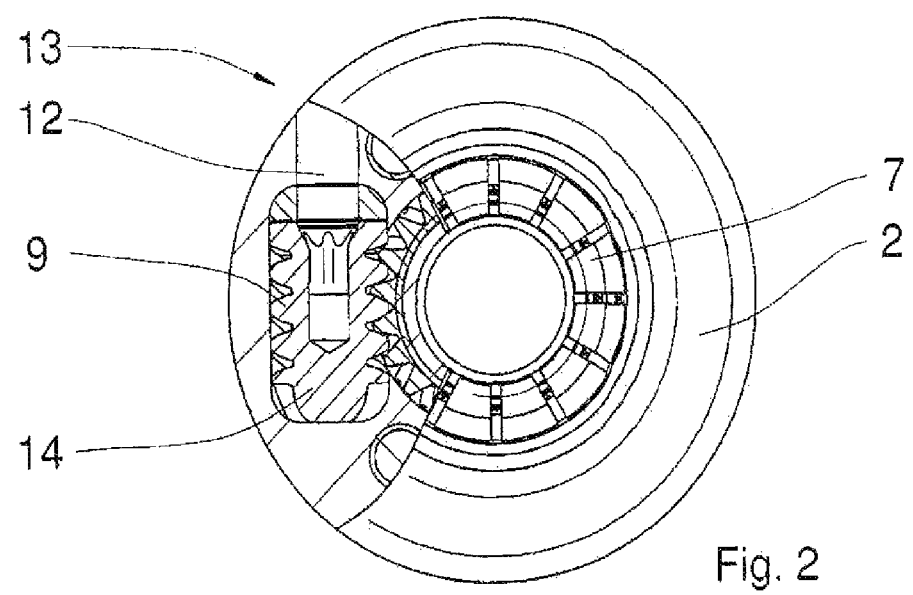
FIG. 2 is partly sectional front end view.
Figure 3:
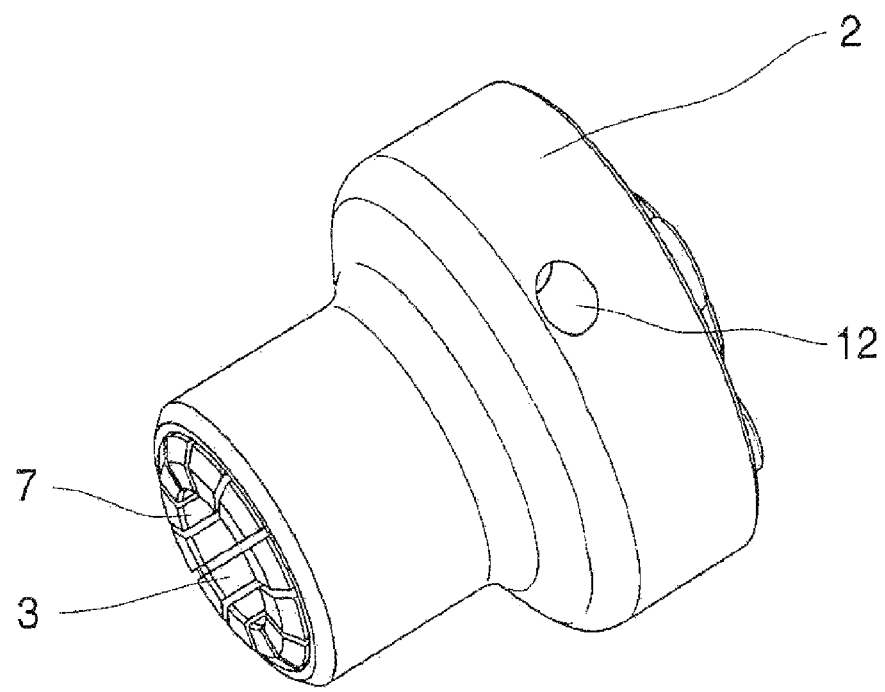
FIG. 3 is a perspective view of the chuck according to the invention.
Figure 4:
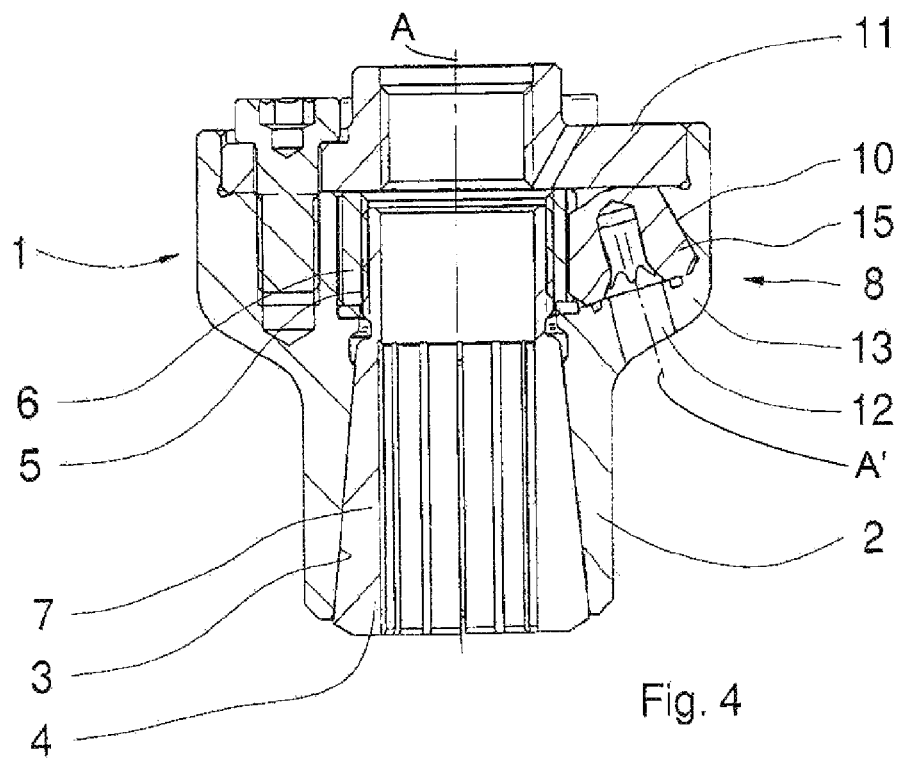
FIG. 4 is a view like FIG. 1 of an alternative embodiment of the chuck.
Figure 5:
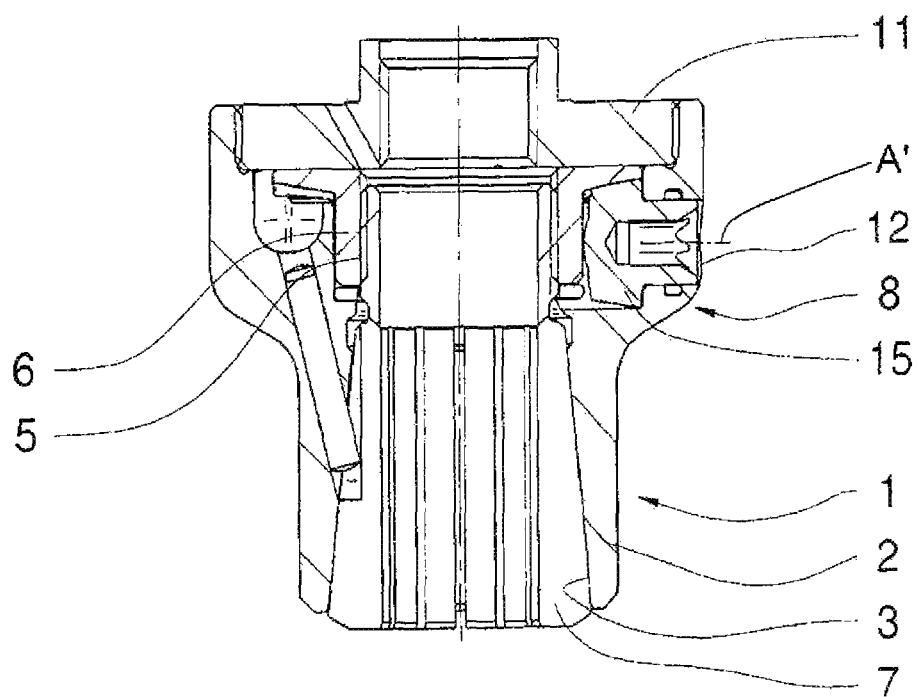
FIG. 5 is a view like FIG. 1 of a further alternative embodiment of the chuck.

In FIGS. 1 to 8 of the drawing, a chuck 1 is shown that has a chuck body 2 in which a frustoconically tapered centering hole 3 is formed. A clamping member 4 in the centering hole 3 has a thread 5 on its rear end extending into the chuck body 2 and engaged a threaded ring 6 axially fixed in the chuck body 2 and coaxial with the clamping member 4. Here, the clamping member 4 is a slotted sleeve 7 whose slots are filled with rubber to keep out dust. The threaded ring 6 is part of an angle drive 8 with a drive member 9 that fits in a body cavity 10. The body cavity 10 is accessible from the rear end opposite the centering hole 3 so that the drive member 9 can be inserted into the body cavity 10 that subsequently can be closed by an end plate 11 supported on the chuck body 2 or the threaded ring 6. The drive member 9 itself is accessible for a drive tool through an aperture 12 in a cavity wall 13 so that rotating the drive member 9 turns the threaded ring 6 and axially shifts the clamping member 4 relative to the threaded ring 6 in the frustoconically tapered centering hole 3 so that there is the possibility, depending on the rotation direction of the clamping member 4, to clamp or release a tool. In the embodiment shown in FIGS. 1 to 3, the angle drive 8 is a worm drive with a worm gear 14 externally meshing with and driving the threaded ring 6. In contrast, FIGS. 4 and 5 show embodiments in which the angle drive 8 is formed by a bevel gear 15 as drive member 9.

Figure 6:
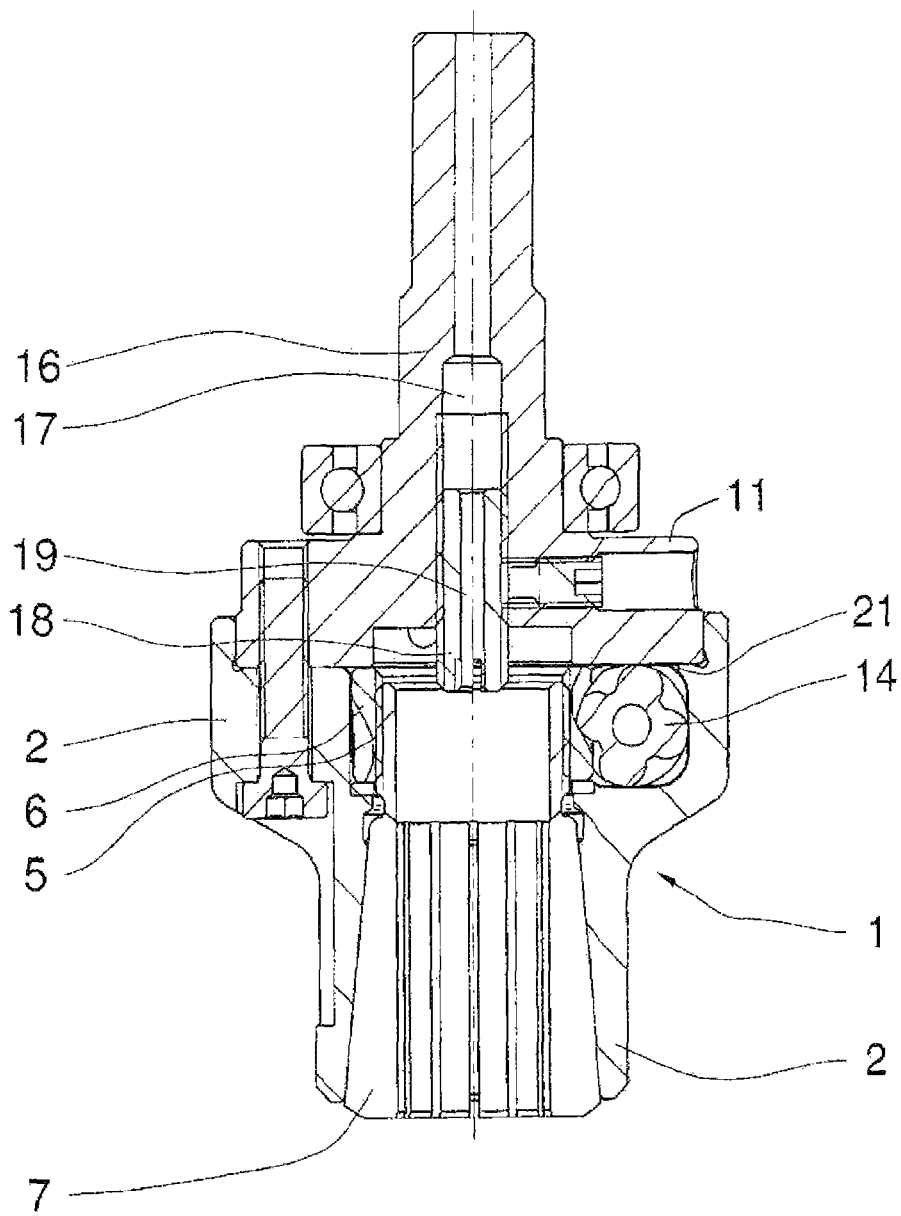
FIG. 6 is a view like FIG. 1 of a chuck mounted on a drive spindle.

FIG. 6 shows an embodiment in which, for securing the drive member 9 in the body cavity 10, the plate 11 is formed by the front end of a drive spindle 16 in which, furthermore, a passage 17 is formed into which a tubular stop screw 18 is inserted that also has a bore 19 so that it is possible to blast air through the passage 17 and the stop screw 18 into the interior of the chuck body while the stop screw 18 serves as depth stop for a tool to be inserted into the clamping member 4.

Figure 7:
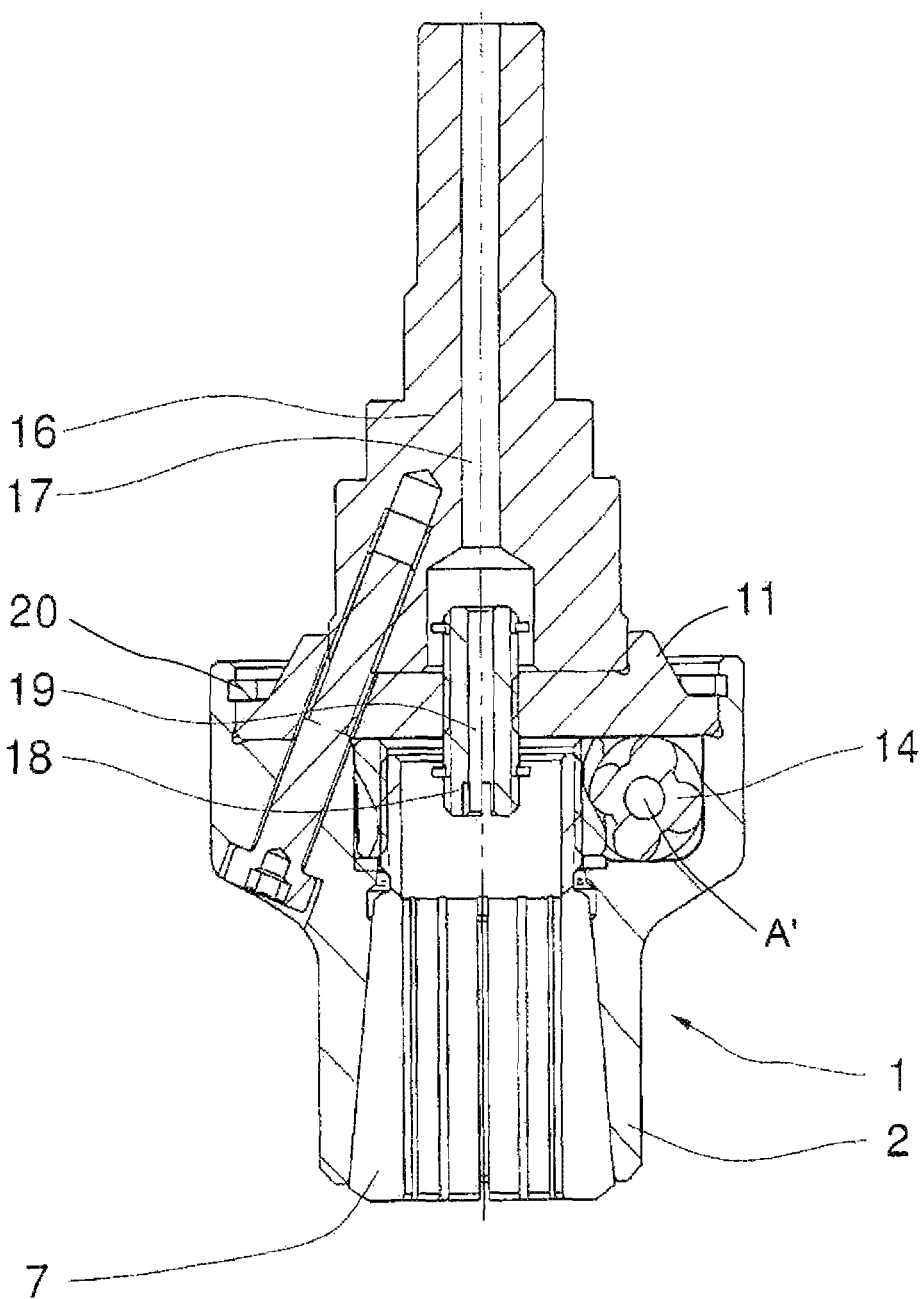
FIG. 7 is a view like FIG. 6 of a further alternative embodiment.

FIG. 7 shows the possibility that even with the chuck 1 fastened to the drive spindle 16, a plate 11 can be used as independent component, while the chuck 1 is secured to the drive spindle 16 by at least one, advantageously a plurality of screws that are uniformly distributed around its circumference. In the embodiment shown in FIG. 7, the plate 11 is secured to the chuck body 2 by a retaining ring 20 so that the chuck 1 is completed and finished for transport separately from the drive spindle 16.

Figure 8:
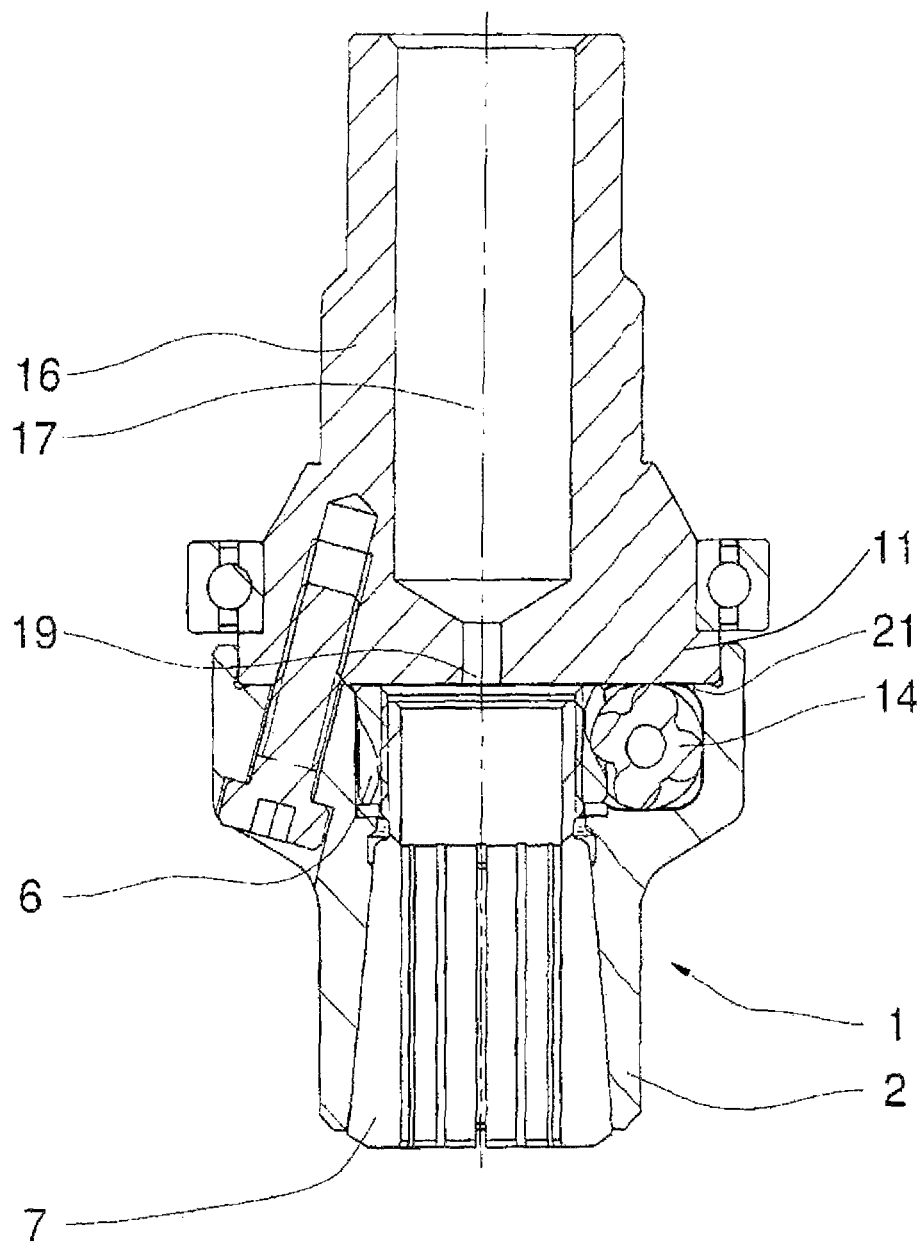
FIG. 8 is a view like FIG. 6 of a further embodiment.

FIGS. 6 and 8 show an undercut 21 whose inner radius is such that, even without an adequate plate 11, it forms a first provisional locking of the angle drive 14.

The invention claimed is:

1. A chuck comprising:
a chuck body centered on a chuck axis, having an axially forwardly open frustoconically tapered centering hole centered on the chuck axis, and formed with an axially rearwardly open cavity that is opened radially inwardly into the centering hole and closed radially outwardly and with an aperture opening inwardly into the cavity and outwardly to the exterior;
a clamping member in the centering hole and having a clamping thread;
an angle drive having
a threaded ring in the cavity, threadedly engaged with the clamping thread, coaxial to the clamping member, and rotatable in the cavity about the chuck axis, and
a drive member rotatable in the cavity about a drive axis not parallel to the chuck axis, fittable axially forwardly into the cavity, and accessible to a drive tool through the aperture; and
a plate secured to the chuck body or the threaded ring, fixing the threaded ring axially in the chuck body, and axially rearwardly closing the cavity and retaining the drive member therein, the aperture being centered on the drive axis and of such a cross-sectional size that the drive member cannot fit through it such that the drive member and the threaded ring can only be removed from or installed into the cavity when the plate is not rearwardly closing the cavity.

2. The chuck according to claim 1, wherein the angle drive is a worm drive with a worm gear as the drive member.

3. The chuck according to claim 2, further comprising:
a retaining ring connecting the plate to the chuck body.

4. The chuck according to claim 1, wherein a bevel gear is the drive member.

5. The chuck according to claim 1, wherein the plate is detachably secured to the chuck body.

6. The chuck according to claim 5, further comprising:
a stop screw in a tapped bore of the plate.

7. The chuck according to claim 6, wherein the plate is formed by a front end of a drive spindle.

8. The chuck according to claim 7, wherein a passage is formed in the drive spindle.

9. The chuck according to claim 8, wherein a bore is formed in the stop screw and communicates with the passage.

10. The chuck according to claim 1, wherein the cavity is formed with an inner radius forming an undercut.

11. The chuck according to claim 1, wherein the clamping member is a slotted sleeve.

12. The chuck defined in claim 1, wherein the chuck body is one piece.

13. A chuck comprising:
a chuck body rotatable about a body axis and having a forwardly open frustoconically tapered hole, a rearwardly open and radially outwardly closed drive cavity, and a nonaxially open tool aperture opening inwardly into the cavity and externally to the exterior;
a radially compressible clamping member in the hole axially shiftable in the chuck body to grip a tool in the hole and formed with a screwthread;
a threaded ring in the cavity, rotatable about the axis in the cavity, and threadedly engaged with the screwthread of the clamping member, whereby rotation of the ring axially shifts the clamping member;
an angle-drive member rotatable about a drive axis not parallel to the body axis in the cavity, accessible through the aperture, and operatively engaged with the threaded ring such that rotation of the drive member about the drive axis rotates the ring about the body axis;
a plate rearwardly closing the cavity, axially fixing the threaded ring in the cavity, and axially retaining the drive member in the cavity, the aperture being centered on the drive axis and of such a cross-sectional size that the drive member cannot fit through it and the drive member and the threaded ring can only be removed from or installed into the cavity when the plate is not rearwardly closing the cavity; and
fastening means for securing the plate to the body or to the ring for retaining the drive member in the cavity.

14. The chuck defined in claim 13 wherein the fastening means is a screw engaged in the chuck body.

15. The chuck defined in claim 13 wherein the fastening means is a snap ring engaged in the chuck body.

16. The chuck defined in claim 13 wherein the ring has external teeth and the drive member is a gear meshing with the external teeth.

17. The chuck defined in claim 16 wherein the drive member is a bevel gear.

18. The chuck defined in claim 16 wherein the gear is a worm.

19. The chuck defined in claim 13, further comprising a drive spindle fixed to the chuck body, extending along the axis, and formed with the plate.

20. The chuck defined in claim 13, wherein the chuck body is one piece.

* * * * *